2,750,256

METHOD OF REMOVING A DISSOLVED IRON COMPOUND FROM AN AQUEOUS SOLUTION OF AN AMMONIO COMPLEX OF MANGANESE

Jay Y. Welsh, Brainard, Minn., assignor to Manganese Chemicals Corporation, Minneapolis, Minn., a corporation of Minnesota No Drawing. Application May 17, 1954,
Serial No. 430,432

3 Claims. (Cl. 23—61)

This invention relates to the production of an iron-free aqueous solution of an ammonio complex of manganese, and of an iron-free manganese carbonate product obtained from such a solution, and is particularly concerned with the separation of a dissolved iron compound from an iron-contaminated $CO_2$-containing aqueous solution of an ammonio complex of manganese preparatory to precipitating $MnCO_3$ therefrom. Specific reference is here made to U. S. Patent No. 2,608,463, Reginald S. Dean, August 26, 1952, for a full description of the nature, characteristics and properties of $CO_2$-containing aqueous solutions of ammonio complexes of manganese.

According to the present invention such iron-contaminated solutions are freed substantially completely from their dissolved iron contents by treating them with reactive manganese sulphide. When so treated an exchange reaction is found to take place, between the iron-contaminated solution and the manganese sulphide, in which the manganese of the manganese sulphide replaces the dissolved iron, and insoluble iron sulphide is precipitated and readily removed from association with the solution by a suitable filtering or settling and decanting procedure.

Advantageously, the reactive manganese sulphide treating agent may be prepared by treating a quantity of a strongly ammoniacal solution of an ammonio complex of manganese with a sufficient excess of ammonium sulphide to effect precipitation of manganese sulphide therefrom.

Because the above referred to exchange reaction involves a straight replacement of an iron atom by a manganese atom, it is a sufficient direction to state that the iron-contaminated solution is treated with at least a sufficient amount of manganese sulphide to consitute the stoichiometric equivalent of the amount of dissolved iron in such iron-contaminated solution, since use of a lesser amount of manganese sulphide results in a less than complete removal of the dissolved iron.

The exchange reaction may be effected at room temperature and requires only that the manganese sulphide be well dispersed throughout the iron-contaminated solution. When it is observed that a further incremental addition of manganese sulphide fails to precipitate more iron sulphide, the solution is separated from the precipitated solids whereupon a substantially iron-free manganese carbonate may be precipitated from the solution in known manner.

The manganese sulphide obtained by adding an excess of ammonium sulphide to a portion of pregnant solution is an amorphous precipitate which may be settled from supernatant liquid, thoroughly washed with concentrated ammonia solution to remove excess ammonium sulphide and added in moist form to the body of pregnant solution to be freed from contaminating iron.

I prefer to effect the exchange reaction in a slurry tank provided with a suitable stirrer, and to allow the reactants to be associated for some time in order to complete the exchange.

For separating precipitated iron sulphide from the purified pregnant solution I prefer to add a small amount of a suitable filter aid, e. g., of diatomaceous earth, to the treated solution and then filter the slurry to remove the iron sulphide, in association with the filter aid, from the purified solution.

*Specific example*

Manganese sulphide was precipitated from pregnant liquor by the addition thereto of an excess of ammonium sulphide, and the precipitate was thoroughly washed with concentrated $NH_3$ solution to remove excess ammonium sulphide. A small quantity of the washed MnS was then added to and dispersed in a pregnant liquor containing contaminating iron in solution in the amount of about 0.2 gram per liter (as Fe), and allowed to react for about 10 minutes. The resulting slurry turned black due to precipitated FeS. A small amount of a diatomaceous earth filter aid was then dispersed through the slurry and the latter was filtered yielding a clear filtrate. Manganese carbonate was precipitated from the clear filtrate by suitably reducing the ammonia concentration of the latter by heating at 55–60° C., and was washed and dried. This carbonate product was found, by analysis, to contain not more than 0.004% of Fe, whereas the Fe content of the manganese carbonate product of an untreated portion of the same pregnant liquor analyzed about 0.4% Fe.

I claim:

1. Process of substantially completely removing a dissolved iron compound from an iron-contaminated solution of an ammonio complex of manganese, which comprises treating such ammoniacal solution with manganese sulphide by adding to and dispersing in such iron contaminated solution reactive manganese sulphide in an amount at least stoichiometrically equivalent to the amount of dissolved iron therein.

2. Process as defined in claim 1, in which the treatment is effected at room temperature and with incremental additions of the manganese sulphide to such solution.

3. Process of preparing from an aqueous ammoniacal solution of an iron-contaminated $CO_2$-containing ammonio complex of manganese contaminated with a small but appreciable amount of iron compound in solution a manganous carbonate substantially free from contaminating iron, which comprises adding to and dispersing in said aqueous solution manganese sulphide in an amount at least stoichiometrically equivalent to the amount of dissolved iron compound present in said solution, separating the resulting precipitate of insoluble iron sulphide from the solution by filtration, and percipitating manganous carbonate from the so-treated solution.

References Cited in the file of this patent

UNITED STATES PATENTS

| | | |
|---|---|---|
| 1,793,906 | Christensen | Feb. 24, 1931 |
| 2,608,463 | Dean | Aug. 26, 1952 |

OTHER REFERENCES

Shibler et al.: Benefication of Oxide and Silicate Manganese Ores from Crook, Abany, and Washakie Counties, Wyo., R. I. 445, Bureau of Mines, Dept. of Interior, April 1949, pages 3 and 4.